United States Patent [19]
Howard

[11] Patent Number: 5,567,096
[45] Date of Patent: Oct. 22, 1996

[54] SHEAR-PIN SYSTEM FOR LOGGING TRUCK BUNK

[76] Inventor: Douglas D. Howard, 2565 20th St., Clarkston, Wash. 99403

[21] Appl. No.: 306,190

[22] Filed: Sep. 13, 1994

[51] Int. Cl.⁶ ..................................................... B60P 7/12
[52] U.S. Cl. .................. 410/42; 410/37; 410/81; 411/4; 403/2
[58] Field of Search ........................... 410/32, 34, 36, 410/37, 42, 77, 81; 411/2, 3, 4, 901; 188/376; 403/2; 296/35.2

[56] References Cited

U.S. PATENT DOCUMENTS

| | | | |
|---|---|---|---|
| 1,799,628 | 4/1931 | Knowles | 410/37 |
| 1,915,009 | 6/1933 | Bassetti | 410/81 |
| 4,078,636 | 3/1978 | Yamanaka | 410/87 X |
| 4,193,730 | 3/1980 | Nordin | 410/37 X |
| 4,269,426 | 5/1981 | Bhushan | 280/432 |
| 4,894,043 | 1/1990 | Nixon, Jr. | 403/2 X |
| 5,199,149 | 4/1933 | Matsuura | 403/2 X |
| 5,292,215 | 3/1994 | Roberts | 411/901 X |

FOREIGN PATENT DOCUMENTS

| | | | |
|---|---|---|---|
| 370674 | 5/1990 | European Pat. Off. | 411/4 |
| 2318682 | 10/1923 | Germany | 410/37 |
| 1318451 | 6/1987 | U.S.S.R. | 410/37 |
| 1701581 | 12/1991 | U.S.S.R. | 410/32 |

*Primary Examiner*—Karen Merritt
*Assistant Examiner*—Stephen Gordon
*Attorney, Agent, or Firm*—Ken J. Pedersen; Barbara S. Pedersen

[57] ABSTRACT

Embodiments of a log bunk shear-pin system are shown and described, each embodiment including a shear-pin that engages a log bunk and prevents the bunk from swiveling when the truck is being loaded or unloaded, but that releases the bunk when the shear-pin is mistakenly left engaged during travel. The shear-pin shears, or otherwise comes apart, when the power of the log load or the turning tractor forces the bunk to swivel relative to the tractor or trailer. The preferred shear-pin comprises a shoulder pin and a pin cap connected with a threaded insert. When the forces of a swiveling bunk push on the pin cap and the shoulder pin sideways in opposite directions, the insert breaks. A new insert may then be easily installed into the undamaged pin cap and shoulder pin. Thus, the shear-pin prevents damage to the bunk-ears and only allows damage of an inexpensive and replaceable portion of the shear-pin.

5 Claims, 4 Drawing Sheets

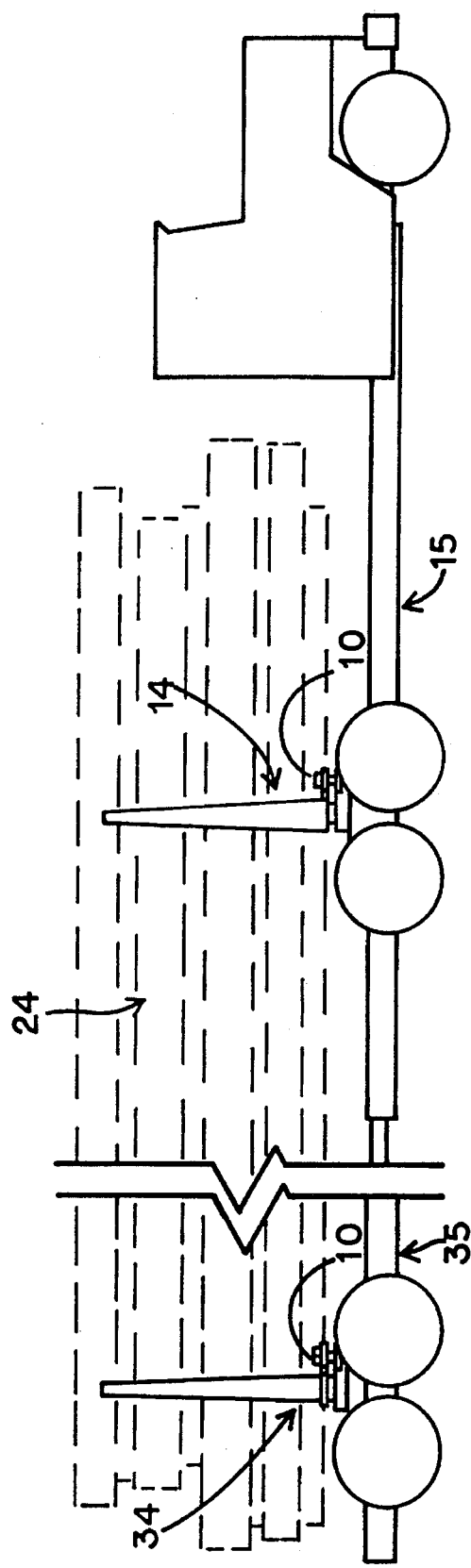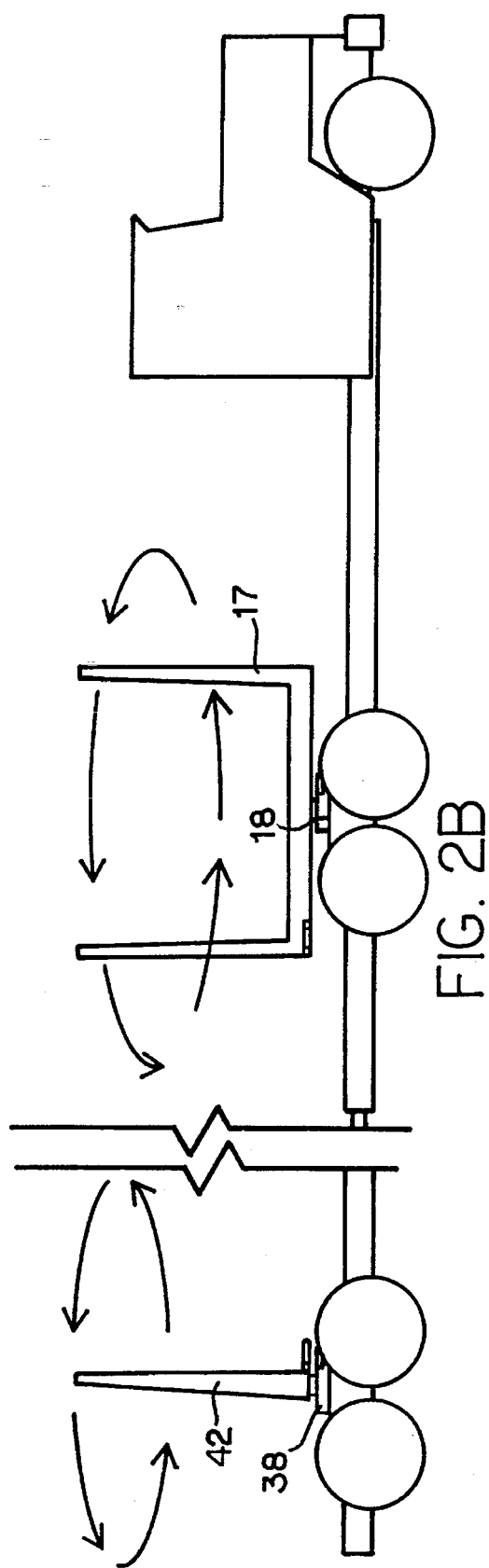

SHEAR-PIN SYSTEM FOR LOGGING TRUCK BUNK

BACKGROUND OF THE INVENTION

1. Field of the Invention

This invention relates generally to log bunks, which are the U-shaped supports for holding logs on a tractor-trailer for over-the-road transportation. More specifically, the invention relates to a replacement for the bunk-pins, which prevent the log bunk from swiveling relative to the tractor or trailer during loading or unloading of the logs.

2. Related Art

Many logging trucks comprise a tractor-trailer combination, in which the tractor and the trailer each include a log bunk system for receiving the logs. As defined in this document, each log bunk system includes a U-shaped bunk, a generally horizontal bridge to which the bunk is connected, and bunk-ears. The bridge of the tractor bunk system is usually removably connected to the rear of the tractor and the bridge of the trailer bunk system is usually connected to the trailer above the trailer wheels. Each log bunk has a horizontal cross-bar with two upright arms upending from the cross-bar. Each bunk is rotationally connected to its respective bridge in such a way that the bunk can swivel, relative to the stationary bridge, around the center of the cross-bar, with the cross-bar rotating around its center in a horizontal plane. Each bunk swivels independently.

The trailer includes a long bar member, called a reach, which extends forward from the trailer bunk system for being hitched to, or otherwise connected to, the rear of the tractor. The reach typically includes a piston or spring system to allow some lengthening and shortening of the reach during operation of the logging truck.

When logs are loaded onto the tractor-trailer, they are stacked with one end resting in the tractor bunk and the other end resting in the trailer bunk. Bunk-pins are used to prevent the bunks from swiveling during log loading and consequently interfering with safe and efficient loading. Bunk-pins (BP) are inserted through the bunk-ears, as illustrated in FIG. 1 and 3. One bunk-ear extends from the bottom region of the bunk and one bunk-ear extends from the upper region of the corresponding bridge. When a bunk is positioned to be perpendicular to the longitudinal axis of the trailer or tractor, then the holes in the two bunk-ears align with each other and can receive a bunk-pin through both holes, thus, holding the bunk in place and preventing swiveling relative to the bridge.

As logs are loaded, they provide rigidity to the system because they themselves are rigid and they extend through both bunks. Once the logs are loaded, the bunk-pins may then be removed, because the logs form a rigid unit and keep the two bunks of the truck parallel to each other. Once the logs are loaded, the bunk-pins should be removed to allow the small amount of movement of the bunks that can occur when a load of logs settles and to allow the bunks to swivel during the travel of the truck on the road. The tractor bunk, especially, must swivel during travel, because the tractor steers the truck into a turn by turning relative to the log load and therefore relative to the tractor bunk. The trailer bunk also swivels, to a lesser degree than the tractor bunk, keeping steering and cornering safe and lessening the stress placed on the rear of the trailer.

Preferably, therefore, the bunk-pins are removed from the bunk-ears after log loading and are placed in a holder near the bunk-ears for easy access at the truck's destination for replacement in the bunk-ears before log unloading. When the bunk-pins are mistakenly left in the bunk-ears during travel, the bunk-pins are often severely bent or the bunk-ears are torn, requiring replacement of bunk-pins or welding and/or repair of the bunk-ears.

SUMMARY OF THE INVENTION

The instant invention comprises a shear-pin that engages a log bunk and prevents the bunk from swiveling when the truck is being loaded or unloaded, but which releases the bunk when the shear-pin is mistakenly left engaged during travel. The shear-pin shears, or otherwise comes apart, when the power of the log load or the turning tractor forces the bunk to swivel relative to the tractor or trailer, thus, preventing damage to the bunk or bunk-ears.

The preferred embodiment of the shear-pin is designed to come apart with minimal damage to the shear-pin, so that the shear-pin may be easily repaired and reused. The preferred shear-pin comprises a shoulder pin and a pin cap connected with a threaded insert. When a bunk swivels relative to its respective bridge during travel, the resulting forces push the pin cap and the shoulder pin sideways in opposite directions with force sufficient to break the insert. The ends of the insert typically remain in the cap and the pin, but the pieces of the insert may be easily removed with an easy-out, for example. A new insert may then be easily installed into the undamaged pin cap and shoulder pin. Thus, the shear-pin prevents damage to the bunk-ears and only allows damage of an inexpensive and replaceable portion of the shear-pin.

BRIEF DESCRIPTION OF THE DRAWINGS

FIG. 2A is a schematic side view of a logging truck, with the log bunks perpendicular to the truck and holding logs shown in dashed lines, and with one embodiment of the invented shear-pin inserted into the bunk-ears of the tractor bunk and also into the bunk-ears of the trailer bunk.

FIG. 2B is a schematic side view of the logging truck of FIG. 2A without the logs, with the spear-pin removed from the tractor bunk and the tractor bunk swiveled to place it generally parallel to the logging truck.

DETAILED DESCRIPTION OF THE PREFERRED EMBODIMENT

Figure 1:
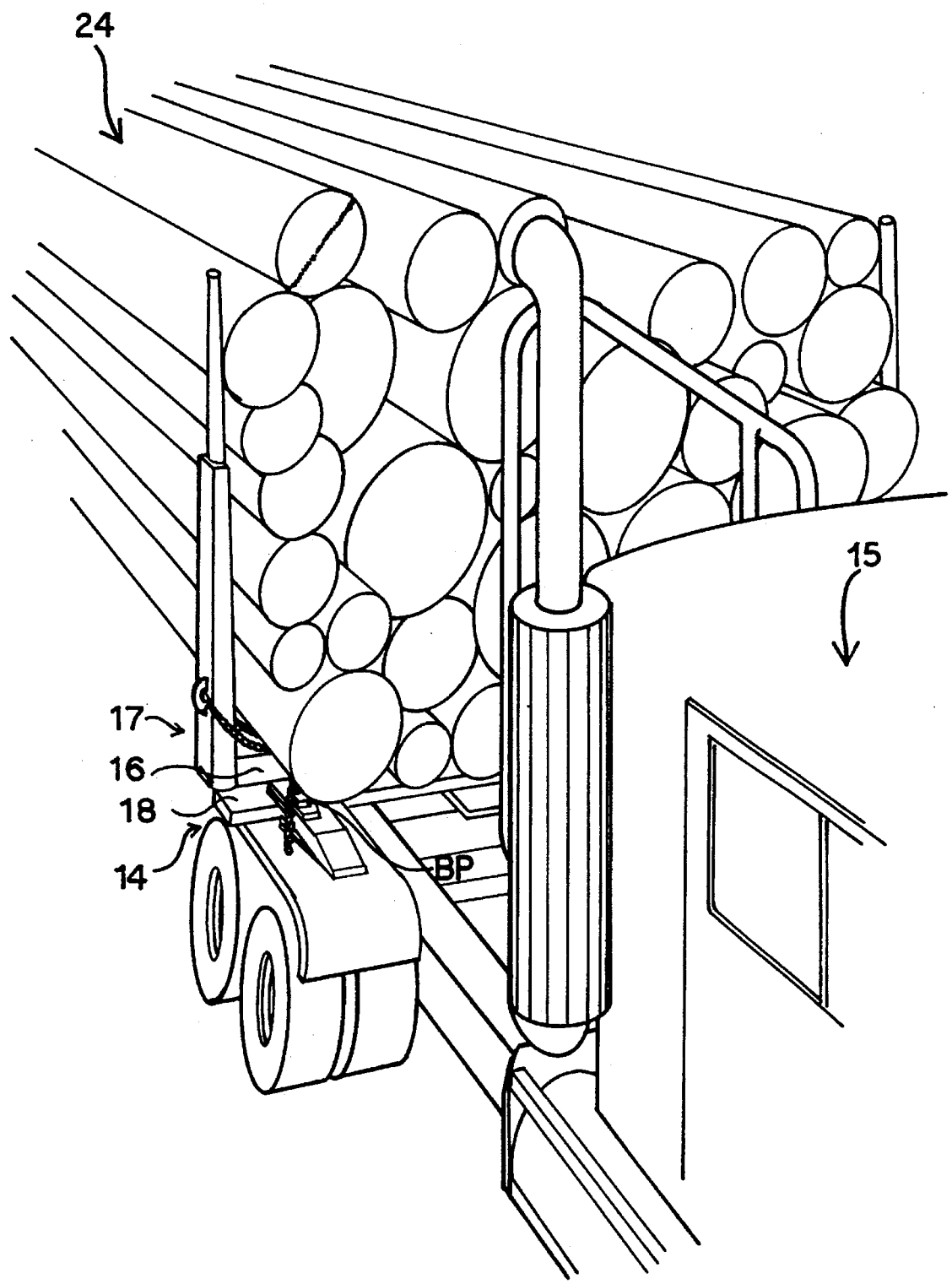
FIG. 1 is a perspective view of the front of a logging truck, showing the tractor and the tractor log bunk holding logs, wherein the log bunk is secured by a bunk-pin.
Figure 3:
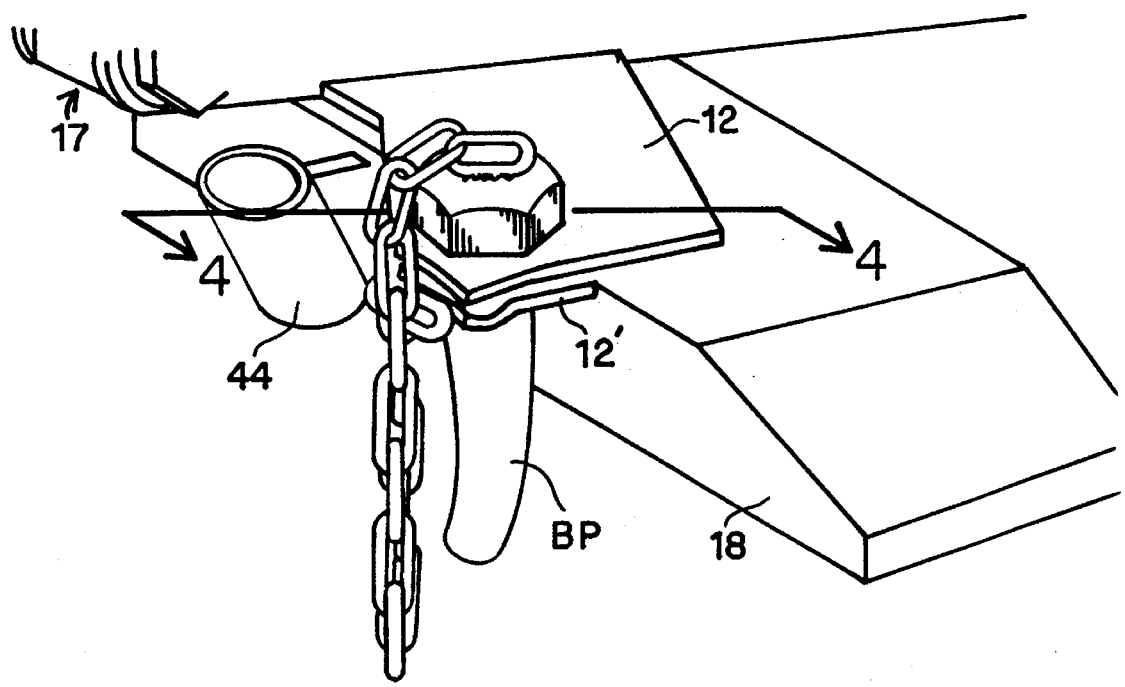
FIG. 3 is a detailed view of a prior art bunk-pin inserted into a set of bunk-ears.
Figure 4:
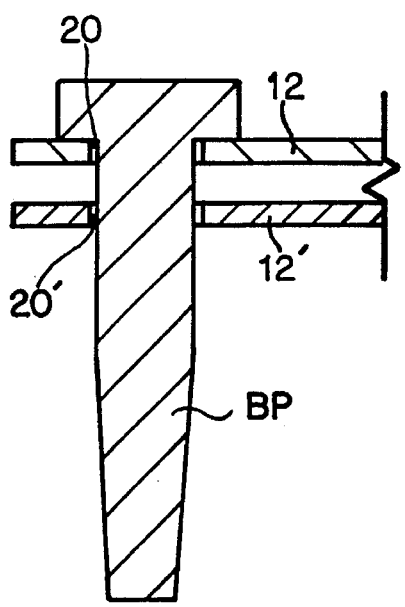
FIG. 4 is a cross-sectional view, along the line 4—4 of FIG. 3, showing the interior of the prior art bunk-pin of FIG. 3.
Figure 5:
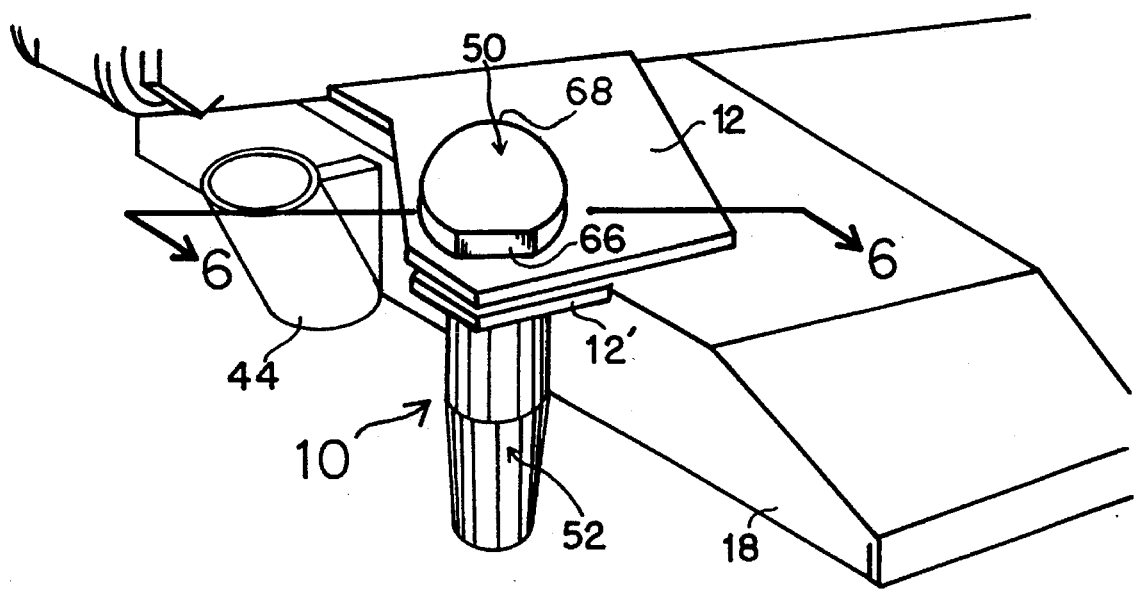
FIG. 5 is a detail view of one embodiment of the invented shear-pin inserted into a set of bunk-ears.
Figure 6:
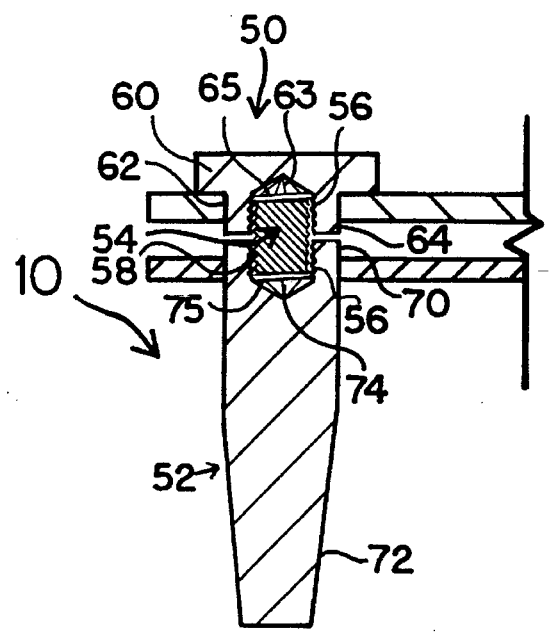
FIG. 6 is a cross-sectional view, along the line 6—6 of FIG. 5, showing the interior of the shear-pin embodiment of FIG. 5.

Referring to FIGS. 2, 5 and 6, there is shown the preferred, but not the only, embodiment and use of the invented shear-pin 10 for logging truck bunks. FIGS. 1, 3 and 4 illustrate the conventional use of bunk-pins for logging truck bunks.

The invented shear-pin 10 is placed in the bunk ears 12, 12' of the tractor bunk system 14, which is installed on the tractor 15. The upper bunk-ear 12 is attached to the cross-bar 16 of the bunk 17, and the lower bunk-ear 12' is attached to the bridge 18. The upper bunk-ear 12 and lower bunk-ear 12' are plates that have holes 20, 20', which are aligned when the bunk 17 lies in a vertical plane perpendicular to the longitudinal axis of the tractor-trailer combination. With the shear-pin 10 inserted into the aligned holes 20, 20', the bunk 17 is prevented from swiveling under the normal forces of log 24 loading or unloading.

FIG. 2 also shows the shear-pin 10 in place in the bunk ears of the trailer bunk system 34, which is installed on the trailer 35. Similar to the design of the tractor bunk system 14, the trailer bunk system 34 has an upper bunk-ear attached to the cross-bar, and a lower bunk-ear attached to the bridge 38. The upper bunk-ear and lower bunk-ear have holes, which are aligned when the bunk 42 lies in a vertical plane perpendicular to the longitudinal axis of the tractor-trailer combination. With the shear-pin 10 inserted into the aligned holes, the bunk 42 is prevented from swivelling under the normal forces of log 24 loading or unloading.

Once the logging truck is loaded, the logs 24 and bunks 17, 42 form a rigid unit, wherein the logs 24 hold the bunks 17, 42 generally parallel to each other and perpendicular to the logs 24 and the axis of the logging truck. The shear-pins 10 should then be removed from both the tractor bunk system 14 and the trailer bunk system 34, so that the bunks 17, 42 can swivel as necessary during over-the-road travel, as described in the Related Art section above. An optional holder 44 for each shear-pin 10 can be included to store the shear-pins 10 close to the bunk-ears for reinsertion at the truck's destination prior to log unloading.

The preferred shear-pin 10 comprises a pin cap 50 and a shoulder pin 52, which are connected by a removable insert 54. Both the pin cap 50 and shoulder pin 52 are tapped with interior threads 56. The threads 58 of the insert 54 cooperate with the cap and pin threads 56 to hold together the pin cap 50 and shoulder pin 52 securely enough so that the shear-pin 10 holds the bunk 17, 42 in place under the forces of log loading and unloading. However, the insert 54 is designed so that the forces on the shear-pin 10 during travel will break or shear the insert 54, thus separating the shear-pin 10 into two parts and allowing the bunks 17, 42 to swivel appropriately.

The insert 54 is preferably a cylinder about 1.125 inches long, with about a 0.75 inch diameter. The insert threads 58 are preferably ¾-16-2B threads.

The pin cap 50 preferably has a head 60 and a generally cylindrical shaft 62 extending downwardly from the head 60. The shaft 62 has a 1.50 inch outer diameter and an open interior space 63 extending from the bottom 64 of the shaft 62 up into the shaft 62 towards the head 60. The interior space 63 is "open" in that it has an opening at the bottom 64 of the shaft 62. The interior surface 65, which defines the space 63, is tapped about 0.500 inch deep with ¾-16/2B threads for receiving one end of the insert 54. The head 60 is made from 2 ¼ inch diameter stock, with preferably one flat-side 66 for making the pin cap 50 more compatible with wrenches or other tools, in case such a tool must be used to free the shear-pin 10 from the bunk-ears. The preferred head 60 is about 1.94 inches across from the flat side 66 to the opposite side 68. The shaft 62 is connected to, or integrally extends from, the head 60 and is offset slightly from the center of the uncut head or cap stock.

The shoulder pin 52 is a generally cylindrical shape, 4 ½ inches long and 1 ½ inches in outer diameter at the top end 70. The shoulder pin 52 is tapered at about 5 degrees from about midway on the shoulder pin 52 toward the bottom end 72. The shoulder pin 52 has an open interior space 74 extending from its top end 70 downwardly into the pin 52. The interior space 74 is "open" in that it has an opening at the top end 70 of the shoulder pin 52. The interior surface 75, which defines the interior space 74, has about a 0.75 inch diameter and is tapped with ¾-16-2B threads about 1 ⅛ inch deep.

The insert 54 can be turned into the pin cap 50 and the shoulder pin 52, so that pin cap head 60 meets the top end 70 of the shoulder pin 52. The insert 54 is preferably shorter than the sum of the depths of the interior spaces 63, 74, so that there is some leeway in the depth to which each end of the insert 54 is turned into the pin cap 50 and shoulder pin 52.

The length of the shaft 62 and the shoulder pin 52 are designed so that the upper bunk-ear 12 pushes sideways on the pin cap shaft 62 and the lower bunk-ear 12' holds still the shoulder pin 52. Thus, in effect, the pin cap 50 and shoulder pin 52 are forced apart in opposite sideways directions, and the insert 54 breaks.

The pin cap 50 is preferably, but not necessarily, made of 2.250 inch Round 12L14 steel. The shoulder pin 52 is preferably, but not necessarily, made of 1.5 inch Round 12L14 steel. The insert 54 is preferably, but not necessarily, made of brass or of ¾ Round ultra-high-molecular-weight (UHMW) plastic. The strength of the pin cap 50 and shoulder pin 52 relative to the insert 54 is an important criteria for design of the shear-pin 10, because the insert 54 should break, snap, strip, or shear in two, without damage to the pin cap 50, the shoulder pin 52, or the interior threads 56, when a sufficient sideways force is applied on the pin cap 50 relative to the shoulder pin 52. By "sufficient sideways force" is meant the forces such as are placed on the shear-pin 10 when the tractor-trailer travels on the road, but not the forces of normal log loading and unloading. By "applied on the pin cap 50 relative to the shoulder pin 52" means that the pin cap 50 is pushed, in effect, to one side while the shoulder pin 52 is pushed to the other side or held in place.

Alternatively, other designs of shear-pins may be included in the instant invention, for example, one-piece shear-pins or shear-pins with inserts that are held in binding relationship in the pin cap or shoulder pin by some means other than threads. The terms "shear" and "shear-pin" in this document are intended to include any pin or fastener that breaks, ie comes apart, pulls apart, snaps, strips its threads, etc., to release the log bunk and allow it to swivel without damaging the bunk-ears. Also, shear-pins with dimensions and shapes other than those described above are included in the instant invention.

The term "bunk-ears" refers to any system for receiving a shear-pin for holding the bunk still relative to the rest of the tractor or the rest of the trailer. For example, still falling within the term "bunk-ears", alternative bracket or plate shapes, other than the traditional plate with a hole, may be used to receive the shear-pin. A bunk-ear may be connected to the bridge by being attached directly onto the bridge or by being attached to other parts of the tractor or trailer units that are connected to the bridge.

The preferred embodiment and use of the shear-pin 10 illustrates two shear-pins 10, one in the bunk-ears of the tractor bunk and one in the bunk-ears of the trailer bunk, as shown in FIG. 2A. Alternatively, the invention includes the use of other numbers of shear-pins 10: for example, a single shear-pin 10 could be used in just one bunk, or four shear-pins 10 could be used, two on opposite sides of the tractor bunk and two on opposite sides of the trailer bunk.

Although this invention has been described above with reference to particular means, materials and embodiments, it is to be understood that the invention is not limited to these disclosed particulars, but extends instead to all equivalents within the scope of the following claims.

I claim:

1. A shear-pin system for a logging truck tractor or trailer, the shear-pin system comprising a log bunk system and a, shear-pin, wherein the log bunk system comprises:

a bunk for receiving logs and a bridge for being connected to a tractor or trailer, the bunk having a substantially horizontal crossbar connected to the bridge so that the bunk may swivel relative to the bridge with the cross-bar rotating in a horizontal plane, bunk-ear connected to the bunk, and bunk-ear connected to the bridge, wherein each bunk-ear has a hole and the bunk-ear boles are aligned when the bunk is generally perpendicular to the tractor or trailer wherein the shear-pin is received in the aligned bunk-ear holes for restraining movement of the bunk relative to the bridge during loading and unloading of logs, and wherein the shear-pin comprises:

a pin cap having a head portion and a shaft portion extending downwardly from the head portion, the shaft portion having a bottom end and a shaft open interior space extending from the bottom end of the shaft portion up into the shaft portion, an elongated shoulder pin having a top end and having a shoulder pin open interior space extending from the top end down into the shoulder pin, an insert having a first end received in binding relationship inside the shaft open interior space and having a second end received in binding relationship inside the shoulder pin open interior space to removably connect the pin cap to the shoulder pin, wherein opposite sideways forces placed on the pin cap and the shoulder pin by the bunk-ears, caused by road travel of the logging truck, will separate the pin cap and the shoulder pin by breaking the insert.

2. A shear-pin system as set forth in claim 1, wherein the shaft portion has a shaft interior surface defining the shaft open interior space and the insert has an exterior surface, and wherein the said shaft interior surface and the said exterior surface of the insert are threaded for cooperating to removably bind the insert into the shaft interior space.

3. A shear-pin system as set forth in claim 1, wherein the shoulder pin has a shoulder pin interior surface defining the shoulder pin open interior space and the insert has a further exterior surface, and wherein the said shoulder pin interior surface and the said further exterior surface are threaded for cooperating to removably bind the insert into the shoulder pin interior space.

4. A shear-pin system as set forth in claim 1, wherein the insert is made of brass.

5. A shear-pin system as set forth in claim 1, wherein the insert is made of ultra-high-molecular-weight (UHMW) plastic.

* * * * *